(12) United States Patent
Kohlböck

(10) Patent No.: US 11,859,713 B2
(45) Date of Patent: *Jan. 2, 2024

(54) METHOD FOR HYSTERESIS COMPENSATION IN AN ACTUATOR AND A SELECTOR FORK THAT IS ADJUSTABLY BY THIS ACTUATOR

(71) Applicant: MAGNA Powertrain GmbH & Co KG, Lannach (AT)

(72) Inventor: Markus Kohlböck, St. Andrä-Höch (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,402

(22) Filed: Apr. 19, 2023

(65) Prior Publication Data
US 2023/0265920 A1     Aug. 24, 2023

Related U.S. Application Data

(63) Continuation of application No. 17/740,386, filed on May 10, 2022, now Pat. No. 11,639,753.

(30) Foreign Application Priority Data

May 12, 2021 (DE) .................. 10 2021 204 859.5

(51) Int. Cl.
*F16H 61/10* (2006.01)
*F16H 63/32* (2006.01)
(Continued)

(52) U.S. Cl.
CPC ......... *F16H 61/10* (2013.01); *F16H 61/2807* (2013.01); *F16H 63/32* (2013.01);
(Continued)

(58) Field of Classification Search
CPC ...... F16H 61/10; F16H 61/2807; F16H 63/32; F16H 2061/0075; F16H 2061/283; F16H 2063/328
See application file for complete search history.

(56) References Cited

U.S. PATENT DOCUMENTS 2,162,662 A * 6/1939 Indge ................ B24B 21/004
451/493
3,558,125 A * 1/1971 Aaron ................ B65H 31/28
271/279
(Continued)

*Primary Examiner* — Edwin A Young
(74) *Attorney, Agent, or Firm* — Dickinson Wright PLLC

(57) ABSTRACT

A method for hysteresis compensation in an actuator and a selector fork that is adjustable by this actuator and guides a sliding sleeve, by means of a state machine, wherein the selector fork is moved by means of the actuator from a first shift position (xDecoup), namely a neutral position, into at least one second shift position (xCoup), namely a gear position, and vice versa, wherein the position of the actuator (phiAtr, phiCoup, phiDecoup), in the event of a shift request into the neutral position (xDecoup) or into the gear position (xCoup), is corrected on the basis of stored mechanical backlash (phiBL) between the actuator and the selector fork and of a sign (+1, 0, −1) generated by the state machine and associated with the particular shift request.

18 Claims, 4 Drawing Sheets

(51) Int. Cl.
*F16H 61/28* (2006.01)
*F16H 61/00* (2006.01)

(52) U.S. Cl.
CPC ............... *F16H 2061/0075* (2013.01); *F16H 2061/283* (2013.01); *F16H 2063/328* (2013.01)

(56) References Cited

U.S. PATENT DOCUMENTS

| | | | | |
|---|---|---|---|---|
| 3,733,095 A * | 5/1973 | Sinclair | ................... | F03B 11/00 290/1 R |
| 7,770,480 B2 * | 8/2010 | Martin | ................... | F16D 23/02 192/89.29 |
| 11,639,753 B2 * | 5/2023 | Kohlböck | ............... | F16H 61/10 701/51 |

* cited by examiner

| Zustand | phiTarget | signBL |
|---|---|---|
| Coupling | phiCoup | +1 |
| ForceFree Coupled | phiCoup | 0 |
| Decoupling | phiDeCoup | -1 |
| ForceFree Decoupled | phiDeCoup | 0 |

Fig. 3

METHOD FOR HYSTERESIS COMPENSATION IN AN ACTUATOR AND A SELECTOR FORK THAT IS ADJUSTABLY BY THIS ACTUATOR

CROSS-REFERENCE TO RELATED APPLICATIONS

This application is a continuation of U.S. patent application Ser. No. 17/740,386, filed on May 10, 2022, which claims priority to German Application No. DE 10 2021 204 859.5 filed May 12, 2021. The entire disclosure of each of the above applications is incorporated herein by reference.

FIELD OF THE INVENTION

The present invention relates to a method for hysteresis compensation in an actuator and a selector fork that is adjustable by this actuator and guides a sliding sleeve, by means of a state machine.

BACKGROUND OF THE INVENTION

This section provides information related to the present disclosure which is not necessarily prior art.

Selector forks are produced largely without machining by forming sheet metal, for example by means of stamping, drawing or pressing or by combinations of these methods. Therefore, the selector forks are able to be produced cost-effectively from sheet metal particular by mass production and are used increasingly frequently. Further structural elements made of steel can be attached easily to the steel sheet by welding or by means of other types of connection. However, it is complicated to fasten the sliding shoes to the steel sheet of the selector fork, since the sliding shoes on such selector forks should be manufactured from slide-promoting material and not from steel, in order in this way to achieve as far as possible self-lubricating running properties and high wear resistance on the contact surface of the selector fork with respect to the sliding sleeve. According to the prior art, materials such as plastic or brass, for example, are provided at least for the sliding shoes.

A selector fork is moved via an actuator. Actuators generally exhibit hysteresis during their sequence of movements. This means that the actuator moves from a first state into a second state for example when a control signal is applied. If the control signal is set back to "zero", the actuator no longer returns fully into the first state, however.

DE 10 2007 057 203 B4 discloses a method for engaging gears in an automatic gearbox. To fix the position of the selector fork, a sensor is used. The end positions are set by a control loop.

The method deals with the reliable engagement of a gear, wherein the position of the teeth with respect to one another, namely that of the selector sleeve with a movable gear and the associated fixed gear, is determined via a sensor.

For closed-loop control two threshold values are used, which are determined from the axial displacement of the tooth of the gear to be engaged relative to the fixed gear. The two threshold values correspond to positions in which the teeth already overlap. In order to prevent the engagement of the gear from sticking, the position of the tooth to be engaged is requested in a temporally dependent manner. The closed-loop control carried out in the document always requests the first threshold value S1 in order then, depending on the result, to request the second threshold value S2. This is a control loop which is integrated in the control of the actuator.

US 2016 0 230 887 A1 discloses a method for determining a neutral position in a synchronizer. To that end, a sleeve is moved in a first direction, including a second direction, and back again into a neutral position, wherein the neutral position is calculated from the prior movement and the distance between the end stops.

SUMMARY OF THE INVENTION

This section provides a general summary of the disclosure, and is not a comprehensive disclosure of its full scope or all of its features.

It is an object of the invention to specify a method that allows a selector fork to be positioned precisely via an actuator.

This requirement can be covered by the subject matter of the present invention according to the independent claims. Advantageous embodiments of the present invention are described in the dependent claims.

The method according to the invention serves for hysteresis compensation in an actuator and a selector fork that is adjustable by the actuator and guides a sliding sleeve.

The method according to the invention makes use of a state machine.

The selector fork is moved, according to the present invention, via the actuator from a first shift position, namely a neutral position, into at least one second position, namely a gear position, and vice versa, wherein the position of the actuator, in the event of a shift request into the neutral position or into the gear position, is corrected on the basis of stored mechanical backlash between the actuator and the selector fork and of a sign generated by the state machine and associated with the particular shift request.

The actuator is a position-controlled actuator, for example a hydraulic, electromotive, electromechanical or pneumatic actuator.

The selector fork can be manufactured at least partially from plastic. A plastic is understood to be a polymeric material or a composite material with a polymeric content.

In a particularly preferred embodiment variant of the present invention, the actuator, after the selector fork has been actuated into the particular shift position, is mechanically released, i.e. it is controlled into the middle of the mechanical backlash between the actuator and the selector fork under open-loop or closed-loop control.

The actuator is preferably subject to open-loop or closed-loop control via a control unit which contains the state machine.

The shift position of the selector fork is determined preferably via at least one sensor, for example a Hall sensor, wherein a sensor signal from the sensor is processed in the state machine. The sensor is located on the actuator.

The method according to the invention allows, in a simple manner, mechanical backlash correction between an actuator and a selector fork that is adjustable by this actuator. Furthermore, the possibility arises of exactly positioning the selector fork, this in turn having the result that the selector fork is worn less over its service life. The described method generally represents a simple, very flexible, versatile and robust solution for the functional closed-loop control of any desired systems exhibiting backlash. Using the method, the necessary component tolerances can be kept in an acceptable range in terms of costs, without positioning accuracy being impaired.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 3 shows a table with target positions of a selector fork, the state correlations thereof and signs thereof stored in a state machine.

DETAILED DESCRIPTION OF THE INVENTION

Figure 1:
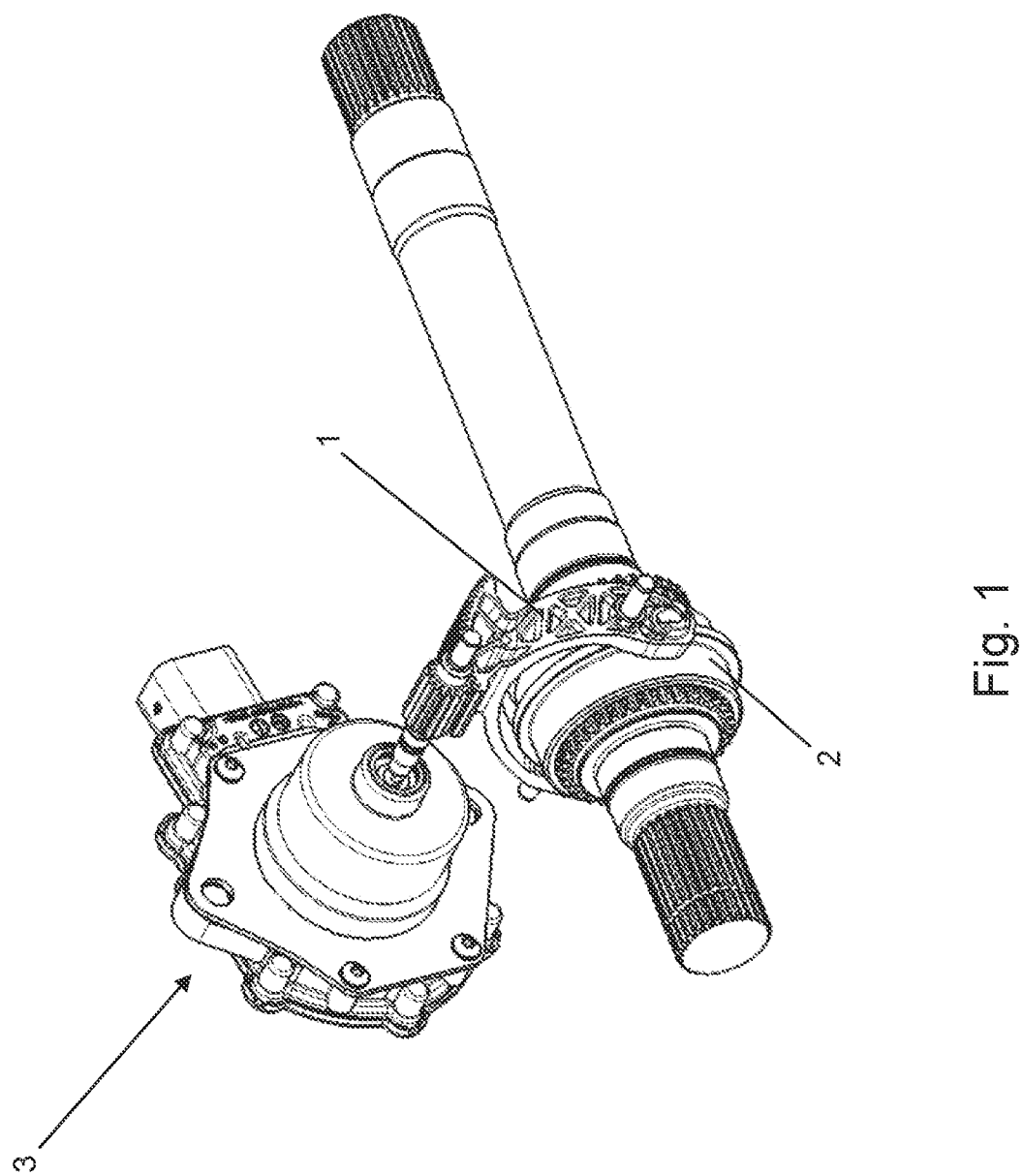
FIG. 1 shows an isometric view of a selector fork and a sliding sleeve.

The method according to the invention serves for hysteresis compensation in an actuator 3 and a selector fork 1 that guides a sliding sleeve 2 (FIG. 1) and is adjustable via the actuator 3. The selector fork 1 can be moved by means of the actuator 3 into two different shift positions, namely a first shift position xDecoup and a second shift position xCoup. The first shift position xDecoup of the selector fork 1 corresponds to a neutral position and the second shift position xCoup corresponds to a gear position. The actuator 3 can, to this end, be actuated into a first position phiDecoup, resulting in the selector fork 1 being moved into the first shift position xDecoup. Furthermore, the actuator 3 can be actuated into a second position phiCoup, resulting in the selector fork 1 being moved into the second shift position xCoup.

If the selector fork 1 is in a shift position xCoup, xDecoup, it is mechanically released via mechanical releasing of the actuator 3.

Figure 2:
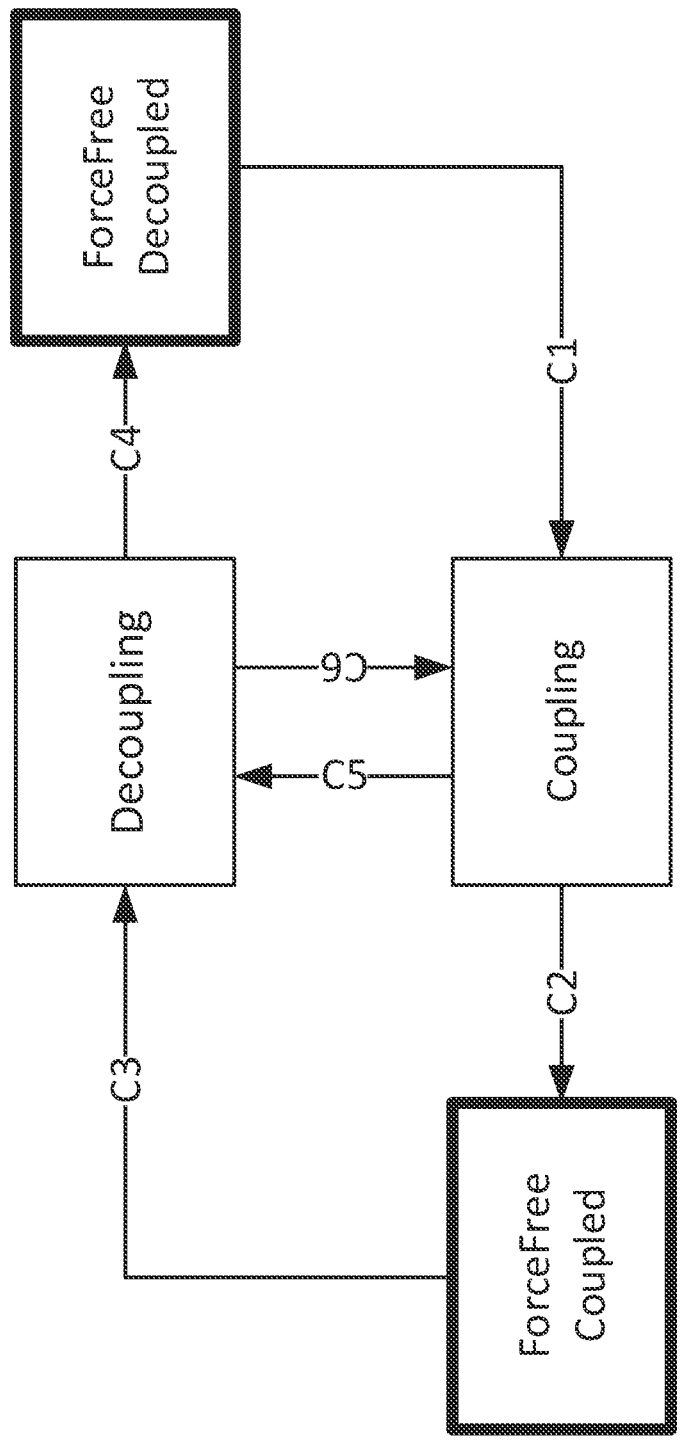
FIG. 2 shows a schematic illustration of a state machine.

The actuator 3 is subject to open-loop or closed-loop control via a control unit (not illustrated in detail) which contains a state machine 4 (FIG. 2).

The particular state of the system, i.e. the particular shift position xCoup, xDecoup of the selector fork 1, is mapped by the state machine 4, which determines a correction of the position setting for the actuator 3 on account of its current and future state.

The starting point is a non-linear system in which the actuator 3 is intended to exactly position the selector fork 1 although it exhibits mechanical backlash phiBL (FIG. 3). In the graph in FIG. 4, a shift position of the selector fork xDgClu (y axis) is plotted versus a position of the actuator phiAtr (x axis).

Figure 4:
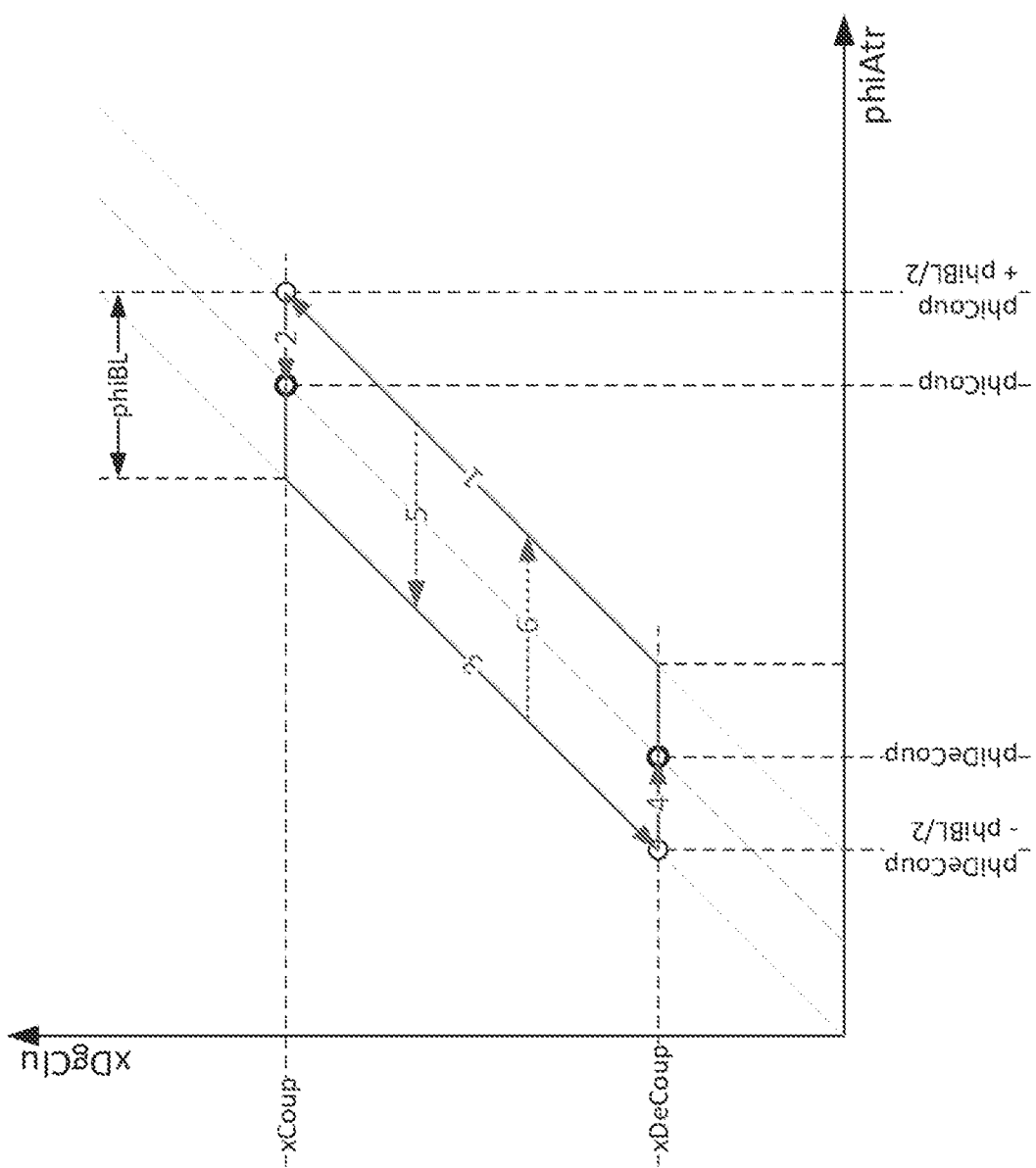
FIG. 4 shows a graph of the hysteresis of an actuator, wherein a position of an actuator is plotted on the x axis and the shift position of a selector fork or of a sliding sleeve is plotted on the y axis.

The selector fork 1 is moved into the first shift position xDecoup via the actuation of the actuator 3 into the first position phiDecoup. The selector fork 1 is moved into the second shift position xCoup via the actuation of the actuator 3 into the second position phiCoup. The selector fork 1 has to be positioned exactly in the first shift position xDecoup, i.e. the neutral position, and in the second shift position xCoup, namely the gear position. Then, the actuator 3 is mechanically released, i.e. moved into the middle of the mechanical backlash phiBL. The particular position of the actuator 3 is described by the value phiAtr (FIG. 4; x axis). The target position phiAtrReq for the actuator can thus be formulated as follows (FIG. 3), phiAtrReq=phiTarget+ signBL*phiBL/2 wherein phiTarget=phiDeCoup or phiCoup, as the first position phiDecoup or the second position phiCoup of the actuator 3, depending on the shifting request.

A sign signBL is generated by the state machine 4, and it can adopt the values +1, 0 and −1 (FIG. 3).

To describe the sequence of the method by way of example, the starting point is an uncoupled state, with the actuator 3 released (FIG. 2, "ForceFree Decoupled"). If a shifting request (FIG. 2, FIG. 3, step C1) is detected, the state machine 4 changes to the "Coupling" status and thus sets the desired position, namely phiTarget=phiCoup, and the associated sign, namely signBL=+1, (FIG. 3). Once the desired position of the actuator 3 has been set by closed-loop control, the actuator 3 and thus the selector fork 1 can start to be released (FIG. 2, FIG. 3, step C2) until phiTarget=phiCoup with the sign signBL=0 (FIG. 2, "ForceFree Coupled"). If a shifting request in the opening direction (FIG. 2, FIG. 3, step C3) is now detected, the state machine 4 changes to the "Decoupling" status and sets the desired position, namely phiTarget=phiDecoup, and the associated sign, namely signBL=−1. Once the target position has been reached, the actuator 3 and thus the selector fork 1 is released, namely until phiTarget=phiDecoup with the sign signBL=0 (FIG. 2, "ForceFree Decoupled"). It is possible to abort the shifting operation (FIG. 2, FIG. 3, steps C5 and C6) at any time. The backlash is always correctly passed through. If further system states are added, only the target position and the associated sing need to be added to the table. In this way, the hysteresis curve (FIG. 2) is always correctly passed through and the exact position of the selector fork 1 can be determined at any time.

What is claimed is:

1. A shift system, comprising:
a selector fork moveable between a first shift position and a second shift position;
an actuator operable for moving the selector fork between its first and second shift positions; and
a state machine for controlling actuation of the actuator, wherein the state machine is operable to correct a position of the actuator, in the event of a shift request into the first shift position or into the second shift position, on the basis of a stored mechanical backlash and a sign generated by the state machine and associated with the corresponding shift request.

2. The shift system of claim 1, wherein the actuator is mechanically controlled into a middle of the backlash following movement of the selector fork into one of the first and second shift positions under an open-loop control or a closed loop control.

3. The shift system of claim 2, wherein the actuator is subject to the open-loop control or the closed-loop control via a control unit which contains the state machine.

4. The shift system of claim 1 further comprising at least one sensor for determining a shift position of at least one of the selector fork and the actuator, and wherein the state machine is operable to process a sensor signal from the at least one sensor.

5. The shift system of claim 1 further comprising a sliding sleeve moveable between a neutral position and a gear position, wherein the selector fork acts on the sliding sleeve such that movement of the selector fork between its first and second shift positions causes corresponding movement of the sliding sleeve between its neutral and gear positions.

6. The shift system of claim 1, wherein the state machine corrects the position of the actuator to provide a hysteresis compensation function.

7. The shift system of claim 1, wherein a shift position of the selector fork is mapped by the state machine for use in determining a correction of the actuator position between a first position and a second position, and wherein movement of the actuator to its first position causes movement of the selector fork to its first shift position and movement of the actuator to its second position causes movement of the selector fork to its second shift position.

8. A shift system, comprising:
a sliding sleeve moveable between a neutral position and a gear position;
a selector fork acting of the sliding sleeve such that movement of the selector fork between first and second shift positions causes corresponding movement of the sliding sleeve between its neutral and gear positions;
an actuator operable for controlling movement of the selector fork between its first and second shift positions; and
a state machine for controlling actuation of the actuator, wherein the state machine is operable to correct a position of the actuator, in the event of a shift request into the first shift position or the second shift position, on the basis of a stored mechanical backlash between the actuator and the selector fork and a sign generated by the state machine and associated with the corresponding shift request.

9. The shift system of claim 8, wherein the actuator is driven, under an open-loop control or a closed-loop control, into a middle of the backlash after the selector fork has been moved into one of its first and second shift positions.

10. The shift system of claim 9, wherein the actuator is subject to the open-loop control or the closed-loop control via a control unit which contains the state machine.

11. The shift system of claim 8 further comprising a sensor for determining a position of the selector fork, and wherein a position signal generated by the sensor is processed by the state machine.

12. The shift system of claim 8, wherein a shift position of the selector fork is mapped by the state machine for use in determining a correction of the actuator position between a first position and a second position, and wherein movement of the actuator to its first position causes movement of the selector fork to its first shift position and movement of the actuator to its second position causes movement of the selector fork to its second shift position.

13. The shift system of claim 8, wherein the state machine corrects the position of the actuator to provide a hysteresis compensation function.

14. A shift system, comprising:
a sliding sleeve moveable between a neutral position and a gear position;
a selector fork acting on the sliding sleeve such that movement of the selector fork between first and second shift positions causes corresponding movement of the sliding sleeve between its neutral and gear positions;
an actuator acting on the selector fork such that movement of the actuator between first and second actuator positions causes corresponding movement of the selector fork between its first and second shift positions; and
a state machine for controlling actuation of the actuator, wherein the state machine is operable to correct an actuator position of the actuator, in the event of a shift request into the first shift position or the second shift position, on the basis of a stored mechanical backlash between the actuator and the selector fork and a sign generated by the state machine and associated with the corresponding shift request.

15. The shift system of claim 14, wherein the state machines corrects the position of the actuator to provide a hysteresis compensation function.

16. The shift system of claim 14, wherein the actuator is driven, under an open-loop control or a closed-loop control, into a middle of the backlash after the selector fork has been moved into one of its first and second shift positions.

17. The shift system of claim 14, wherein a shift position of the selector fork is mapped by the state machine for use in determining a correction of the actuator position between its first and second actuator positions.

18. The shift system of claim 14 further comprising at least one sensor for determining a shift position of at least one of the selector fork and the actuator, and wherein the state machine is operable to process a sensor signal from the at least one sensor.

* * * * *